(12) United States Patent
Seo

(10) Patent No.: US 11,199,229 B2
(45) Date of Patent: Dec. 14, 2021

(54) IN-VEHICLE CONTROL APPARATUS

(71) Applicant: TOYOTA JIDOSHA KABUSHIKI KAISHA, Toyota (JP)

(72) Inventor: Takashi Seo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/072,685

(22) Filed: Oct. 16, 2020

(65) Prior Publication Data
US 2021/0215206 A1 Jul. 15, 2021

(30) Foreign Application Priority Data

Jan. 10, 2020 (JP) .............................. JP2020-002692

(51) Int. Cl.
*F16D 23/02* (2006.01)
*F16D 11/10* (2006.01)
*F16D 23/12* (2006.01)
*F16D 11/00* (2006.01)
*B60K 17/04* (2006.01)

(52) U.S. Cl.
CPC ............ *F16D 23/025* (2013.01); *B60K 17/04* (2013.01); *F16D 11/10* (2013.01); *F16D 23/12* (2013.01); *F16D 2011/002* (2013.01); *F16D 2300/18* (2013.01); *F16D 2500/10456* (2013.01)

(58) Field of Classification Search
CPC ........ F16D 23/025; F16D 11/10; F16D 23/12; F16D 2011/002; F16D 2300/18; F16D 2500/10456; B60K 17/04
See application file for complete search history.

(56) References Cited

U.S. PATENT DOCUMENTS

2012/0247241 A1* 10/2012 Takahashi ................. F16H 3/16
74/329
2013/0233668 A1* 9/2013 Binder ................ F16D 23/0606
192/69.7

FOREIGN PATENT DOCUMENTS

JP 2019-039453 A 3/2019

* cited by examiner

*Primary Examiner* — Tinh Dang
(74) *Attorney, Agent, or Firm* — Oliff PLC

(57) ABSTRACT

An in-vehicle control apparatus is configured to execute a collision degree calculation process of, when it is determined that gear rattle occurs, calculating a collision degree that indicates a magnitude of a collision between a sleeve chamfer and a gear chamfer based on a rotation speed difference between a sleeve and an idler gear, execute an index value calculation process of calculating an index value that correlates with wear and tear of the sleeve chamfer and the gear chamfer based on the collision degree that is calculated each time it is determined that gear rattle occurs, and execute a wear and tear degree calculation process of calculating a degree of wear and tear of the sleeve chamfer and the gear chamfer by integrating the index value that is calculated each time it is determined that gear rattle occurs.

4 Claims, 4 Drawing Sheets

IN-VEHICLE CONTROL APPARATUS

INCORPORATION BY REFERENCE

The disclosure of Japanese Patent Application No. 2020-002692 filed on Jan. 10, 2020 including the specification, drawings and abstract is incorporated herein by reference in its entirety.

BACKGROUND

1. Technical Field

The disclosure relates to an in-vehicle control apparatus.

2. Description of Related Art

For example, Japanese Unexamined Patent Application Publication No. 2019-039453 (JP 2019-039453 A) describes a synchromesh mechanism. The synchromesh mechanism includes an idler gear provided so as to be rotatable relative to a shaft, a sleeve movable in an axial direction of the shaft, and a synchronizer ring that synchronizes the rotation of the idler gear with the rotation of the sleeve.

In JP 2019-039453 A, the degree of abrasion of the synchronizer ring that is a synchronization element is estimated based on a difference between a sleeve position at the start of synchronization where the sleeve contacts with the synchronizer ring and a sleeve position at the end of gear meshing where the sleeve meshes with the idler gear.

SUMMARY

Incidentally, with the configuration described in JP 2019-039453 A, unless abrasion of the synchronizer ring increases to some extent, the degree of wear and tear due to such abrasion is not reflected in the difference between the sleeve positions, so it is not possible to calculate the degree of wear and tear in a state where the wear and tear of the synchronizer ring are small. In JP 2019-039453 A, the degree of wear and tear of the synchronizer ring is calculated, and, other than the synchronizer ring, it is desired to make it possible to calculate the degree of wear and tear from a state where wear and tear are small for components of the synchromesh mechanism.

As a solution to the above task, an in-vehicle control apparatus is applied to a vehicle provided with a synchromesh mechanism. The synchromesh mechanism includes an idler gear, a synchronizer hub, a sleeve, a synchronizer ring, and a movement mechanism. The idler gear is provided on a shaft so as to be rotatable relative to the shaft. The idler gear has splines. The synchronizer hub is configured to rotate integrally with the shaft. The synchronizer hub has splines. The sleeve is disposed radially outward of the synchronizer hub. The sleeve has splines configured to mesh with the splines of the synchronizer hub and the splines of the idler gear. The sleeve is movable in an axial direction of the shaft. The synchronizer ring is provided between the synchronizer hub and the idler gear. The movement mechanism is configured to move the sleeve in the axial direction. The synchromesh mechanism is placed in an engaged state where transmission of driving force between the shaft and the idler gear is enabled, by causing the sleeve to move to mesh the splines of the sleeve with the splines of the idler gear. The in-vehicle control apparatus includes a processor configured to execute a gear rattle determination process of, when the synchromesh mechanism is placed in the engaged state, determining whether gear rattle due to a collision between a sleeve chamfer provided at a distal end of the splines of the sleeve and a gear chamfer provided at a distal end of the splines of the idler gear occurs, execute a collision degree calculation process of, when it is determined that gear rattle occurs, calculating a collision degree indicating a magnitude of collision between the sleeve chamfer and the gear chamfer based on a rotation speed difference between the sleeve and the idler gear, execute an index value calculation process of calculating an index value that correlates with wear and tear of the sleeve chamfer and the gear chamfer based on the collision degree that is calculated each time it is determined that the gear rattle occurs, and execute a wear and tear degree calculation process of calculating a degree of wear and tear of the sleeve chamfer and the gear chamfer by integrating the index value that is calculated each time it is determined that the gear rattle occurs.

With this configuration, when it is determined that gear rattle occurs, a collision degree between the sleeve chamfer and the gear chamfer is calculated based on a rotation speed difference between the sleeve and the idler gear, and an index value that correlates with wear and tear of the sleeve chamfer and the gear chamfer is calculated based on the collision degree. The degree of wear and tear of the sleeve chamfer and the gear chamfer is calculated by integrating the index value that is calculated each time it is determined that gear rattle occurs. The degree of wear and tear is a value that is calculated based on a rotation speed difference between the sleeve and the idler gear when it is determined that gear rattle occurs, as a start point, and such a rotation speed difference is reliably grasped even in a state where the wear and tear of the sleeve chamfer and the gear chamfer is small. Therefore, it is possible to calculate the degree of wear and tear even in a state where the wear and tear of the sleeve chamfer and the gear chamfer of the synchromesh mechanism is small.

In the above in-vehicle control apparatus, the processor may be configured to execute a process of calculating the collision degree based on the rotation speed difference and a movement speed of the sleeve in the collision degree calculation process. With this configuration, in calculating the collision degree, not only the rotation speed difference but also the movement speed of the sleeve is considered, so the accuracy of calculating a collision degree improves.

In the in-vehicle control apparatus, the collision degree that is calculated in the collision degree calculation process may be a collision energy at a collision of the sleeve chamfer and the gear chamfer, and, where the number of collisions between the sleeve chamfer and the gear chamfer when the degree of wear and tear reaches a prescribed value is a limit collision number, the processor may be configured to execute a process of calculating the limit collision number such that the limit collision number reduces as the collision energy increases and calculating a fraction of which a denominator is set to the calculated limit collision number and a numerator is set to one, as the index value in the index value calculation process.

The limit collision number reduces as the collision energy increases, so the index value that is indicated by a fraction of which the denominator is set to the limit collision number and the numerator is set to one increases as the collision energy increases. For this reason, the degree of wear and tear, obtained by integrating the index value, when the collision energy is large increases earlier than the degree of wear and tear when the collision energy is small. Therefore, with this configuration, it is possible to appropriately calculate an index value that correlates with the wear and tear of the sleeve chamfer and the gear chamfer based on the collision degree.

In the in-vehicle control apparatus, the movement mechanism may include an actuator configured to move the sleeve and configured to execute an engagement operation of the synchromesh mechanism through drive control over the actuator, and the processor may be configured to, when the degree of wear and tear is higher than or equal to a prescribed determination value, execute a process of disabling the engagement operation of the synchromesh mechanism.

With this configuration, when the degree of wear and tear is higher than or equal to the prescribed determination value, the engagement operation of the synchromesh mechanism is disabled, so it is possible to suppress an increase in the degree of wear and tear of the sleeve chamfer and the gear chamfer over the determination value.

The gear rattle determination process may be implemented in a known mode. When, for example, there is a rotation speed difference between the sleeve and the idler gear after the rotation of the sleeve is synchronized with the rotation of the idler gear, it may be determined that gear rattle occurs.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
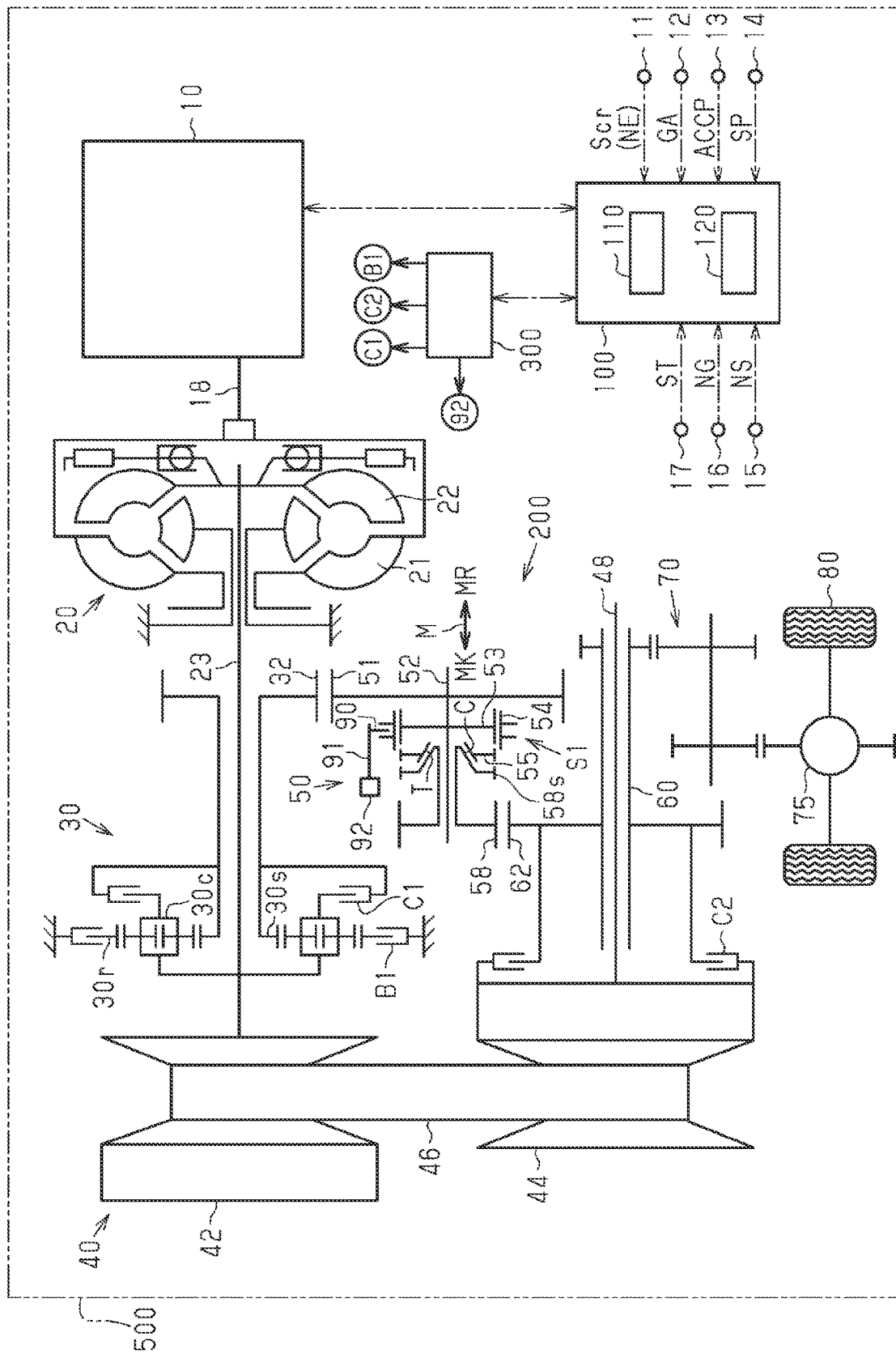
FIG. 1 is a schematic diagram of a vehicle to which an embodiment of an in-vehicle control apparatus is applied.

Hereinafter, an embodiment of an in-vehicle control apparatus will be described with reference to FIG. 1 to FIG. 5. As shown in FIG. 1, a vehicle 500 includes an internal combustion engine 10 and a powertrain 200 that transmits the output torque of the internal combustion engine 10 to drive wheels 80.

The powertrain 200 includes a torque converter 20, an input shaft 23, a belt-type continuously variable transmission 40, a switching mechanism 30, a gear transmission mechanism 50, an output shaft 60, a reduction gear 70, a differential gear 75, the drive wheels 80, and the like. The torque converter 20 is a fluid transmission device to which a crankshaft 18 of the internal combustion engine 10 is connected. The input shaft 23 is connected to the torque converter 20. The belt-type continuously variable transmission 40 is connected to the input shaft 23. The switching mechanism 30 is connected to the input shaft 23. The gear transmission mechanism 50 is connected to the input shaft 23 via the switching mechanism 30 and is connected in parallel with the continuously variable transmission 40. The output shaft 60 that is an output rotating member common to the continuously variable transmission 40 and the gear transmission mechanism 50. Driving force is transmitted from the output shaft 60 to the reduction gear 70. Driving force is transmitted from the reduction gear 70 to the differential gear 75. The drive wheels 80 are connected to the differential gear 75.

The torque converter 20 includes a pump impeller 21 and a turbine impeller 22. The pump impeller 21 is connected to the crankshaft 18 of the internal combustion engine 10. The turbine impeller 22 is connected to the input shaft 23. The switching mechanism 30 is a double-pinion planetary gear train and includes a carrier 30c serving as an input element, a sun gear 30s serving as an output element, and a ring gear 30r serving as a reaction element. The carrier 30c has pinion gears that are in mesh with the sun gear 30s and is connected to the input shaft 23 so as to be integrally rotatable. The ring gear 30r is provided with a brake mechanism B1. The sun gear 30s is connected to a small-diameter gear 32 provided coaxially with the input shaft 23 and rotatable relative to the input shaft 23. The carrier 30c and the sun gear 30s are selectively connected via a first clutch mechanism C1.

The continuously variable transmission 40 includes a primary pulley 42, a secondary pulley 44, and a transmission belt 46. The primary pulley 42 is provided on the input shaft 23 and configured to change its effective diameter by using hydraulic pressure. The secondary pulley 44 is connected to a rotary shaft 48 coaxial with the output shaft 60 and configured to change its effective diameter by using hydraulic pressure. The transmission belt 46 is wound around the primary pulley 42 and the secondary pulley 44. A second clutch mechanism C2 is provided between the secondary pulley 44 and the output shaft 60. When the second clutch mechanism C2 is engaged, torque is transmitted between the secondary pulley 44 and the output shaft 60. When the second clutch mechanism C2 is released, transmission of torque is interrupted between the secondary pulley 44 and the output shaft 60.

The gear transmission mechanism 50 includes the small-diameter gear 32, a counter shaft 52, and a large-diameter gear 51. The large-diameter gear 51 is coaxial with the counter shaft 52 and provided so as to rotate integrally with the counter shaft 52. The large-diameter gear 51 is in mesh with the small-diameter gear 32. The gear transmission mechanism 50 also includes an idler gear 58 and an output gear 62. The idler gear 58 is coaxial with the counter shaft 52 and provided so as to be rotatable relative to the counter shaft 52. The output gear 62 is coaxial with the output shaft 60 and provided so as to rotate integrally with the output shaft 60. The output gear 62 is in mesh with the idler gear 58.

The gear transmission mechanism 50 includes a known synchromesh mechanism S1. The synchromesh mechanism S1 is provided between the large-diameter gear 51 and the idler gear 58. The synchromesh mechanism S1 enables or disables transmission of driving force between the counter shaft 52 and the idler gear 58, and synchronizes the rotation speed of the counter shaft 52 with the rotation speed of the idler gear 58 at the time of enabling the disabled transmission of driving force. In the following description, a state where transmission of driving force is enabled between the counter shaft 52 and the idler gear 58 is referred to as engaged synchromesh mechanism, and a state where transmission of driving force is disabled between the counter shaft 52 and the idler gear 58 is referred to as released synchromesh mechanism.

The synchromesh mechanism S1 includes a synchronizer hub 53, an annular sleeve 54, an annular synchronizer ring 55, and the like. The synchronizer hub 53 is coaxial with the counter shaft 52 and provided so as to rotate integrally with the counter shaft 52. The synchronizer hub 53 has splines on its outer periphery.

The sleeve 54 is disposed radially outward of the synchronizer hub 53. The sleeve 54 has splines on its inner periphery, which are in mesh with the splines of the synchronizer hub 53. The sleeve 54 is movable in an axial direction M of the counter shaft 52.

The idler gear 58 has a cone surface C and splines 58s. The cone surface C is tapered so as to reduce in diameter toward the synchronizer hub 53. The splines 58s are configured to mesh with the splines of the sleeve 54.

The synchronizer ring 55 is annular and coaxial with the counter shaft 52. The synchronizer ring 55 is provided between the synchronizer hub 53 and the idler gear 58. The synchronizer ring 55 has a tapered surface T and splines. The tapered surface T is pressed against the cone surface C of the idler gear 58. The splines are configured to mesh with the splines of the sleeve 54.

The sleeve 54 is provided with a movement mechanism that moves the sleeve 54 in the axial direction M of the counter shaft 52. The movement mechanism includes a shift fork 90, a fork shaft 91, and a hydraulic actuator 92. The shift fork 90 is engaged with the outer periphery of the sleeve 54. The fork shaft 91 moves the shift fork 90 in the axial direction M. The actuator 92 moves the fork shaft 91. The position of the sleeve 54 is controlled by adjusting the amount of movement of the fork shaft 91 through drive control over the actuator 92.

Figure 2A:
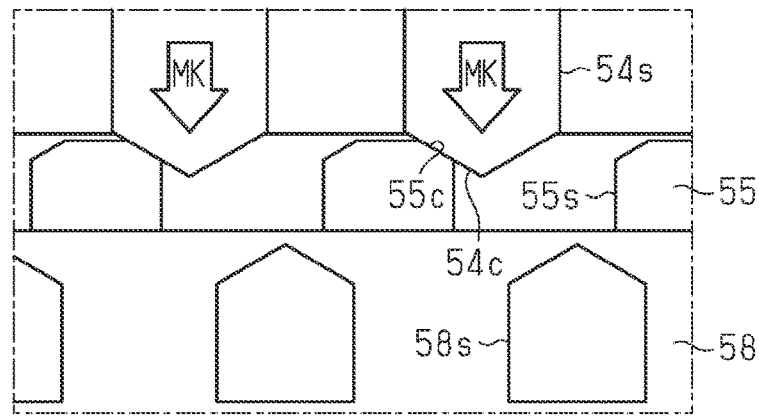
FIG. 2A, FIG. 2B, and FIG. 2C are schematic diagrams that show an engagement operation of a synchromesh mechanism included in the vehicle.
Figure 2B:
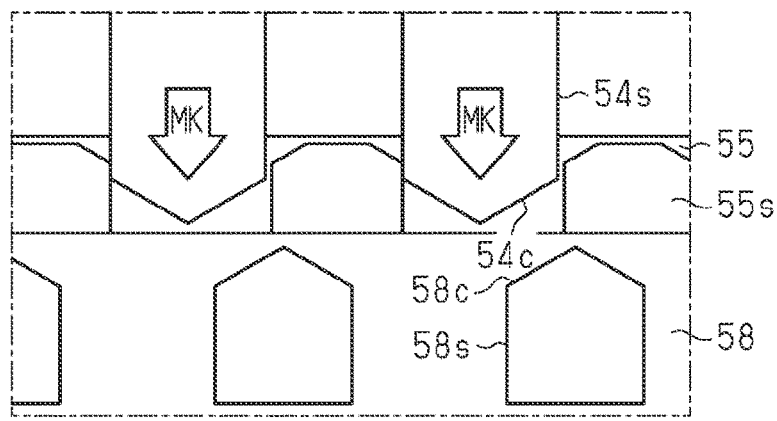
Figure 2C:
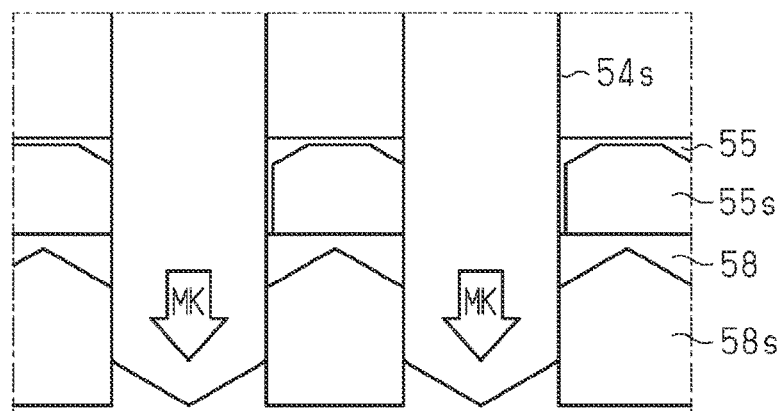

The actuator 92, the first clutch mechanism C1, the second clutch mechanism C2, and the brake mechanism B1 are connected to a hydraulic circuit 300 that hydraulically controls the actuator 92, the first clutch mechanism C1, the second clutch mechanism C2, and the brake mechanism B1. FIG. 2A, FIG. 2B, and FIG. 2C show a synchronization operation of the synchromesh mechanism S1. In the following description, a direction in which the sleeve 54 moves to approach the idler gear 58 in the axial direction M is referred to as engaging direction MK, and a direction in which the sleeve 54 moves away from the idler gear 58 in the axial direction M is referred to as releasing direction MR (see FIG. 1).

As shown in FIG. 2A, when the sleeve 54 moves in the engaging direction MK as a result of the start of engagement in the synchromesh mechanism S1 placed in the released state, a sleeve chamfer 54c provided at the distal end of splines 54s provided on the sleeve 54 contacts a synchronization chamfer 55c provided at the distal end of splines 55s provided on the synchronizer ring 55 to press the synchronization chamfer 55c. When the pressing is started, the tapered surface T of the synchronizer ring 55 is strongly pressed against the cone surface C of the idler gear 58, so large frictional force is generated between the tapered surface T and the cone surface C. With this frictional force, a difference in relative rotation speed between the idler gear 58 and the sleeve 54 progressively reduces and finally there is no difference in the relative rotation speed, with the result that synchronization of the rotation speed of the idler gear 58 with the rotation speed of the sleeve 54 completes.

When synchronization of the rotation speed of the idler gear 58 with the rotation speed of the sleeve 54 completes, the splines 54s of the sleeve 54 thrust into the splines 55s of the synchronizer ring 55 and approach the splines 58s of the idler gear 58, as shown in FIG. 2B.

After that, as shown in FIG. 2C, the splines 54s of the sleeve 54 mesh with the splines 58s of the idler gear 58, with the result that engagement of the synchromesh mechanism S1 completes.

The powertrain 200 shown in FIG. 1 includes a first transmission path and a second transmission path. The first transmission path transmits the output torque of the internal combustion engine 10 to the output shaft 60 via the torque converter 20, the switching mechanism 30, and the gear transmission mechanism 50. The second transmission path transmits the output torque of the internal combustion engine 10 to the output shaft 60 via the torque converter 20 and the continuously variable transmission 40.

When the vehicle 500 runs, one of gear driving to transmit the output torque of the internal combustion engine 10 to the output shaft 60 via the first transmission path that uses the gear transmission mechanism 50 and belt driving to transmit the output torque of the internal combustion engine 10 to the output shaft 60 via the second transmission path that uses the continuously variable transmission 40 is selected.

Gear driving is a drive mode that is selected in a low vehicle speed range including a state during vehicle stop, the first transmission path is established by engaging both the first clutch mechanism C1 and the synchromesh mechanism S1 and releasing both the second clutch mechanism C2 and the brake mechanism B1, with the result that forward travel is enabled. When both the brake mechanism B1 and the synchromesh mechanism S1 are engaged and both the first clutch mechanism C1 and the second clutch mechanism C2 are released, reverse travel is enabled in this gear driving.

In this gear driving, when both the first clutch mechanism C1 and the brake mechanism B1 are released or when the synchromesh mechanism S1 is released, a neutral state where transmission of torque is disabled is established.

Belt driving is a drive mode that is selected in an intermediate vehicle speed range and a high vehicle speed range, the second transmission path is established by engaging the second clutch mechanism C2 and releasing both the first clutch mechanism C1 and the brake mechanism B1, with the result that forward travel is enabled. In the intermediate vehicle speed range, the synchromesh mechanism S1 is placed in the engaged state. On the other hand, in the high vehicle speed range, the synchromesh mechanism S1 is placed in the released state. The reason why the synchromesh mechanism S1 is placed in the released state in the high vehicle speed range is to, for example, eliminate drag of the gear transmission mechanism 50 and the like during belt driving and prevent high rotation of the gear transmission mechanism 50 and component members (for example, pinion gears) and the like of the switching mechanism 30 in the high vehicle speed range.

In this belt driving, when the second clutch mechanism C2 is released, a neutral state where transmission of torque is disabled is established. Various controls such as control over the internal combustion engine 10 and control over the hydraulic circuit 300 that hydraulically controls the actuator 92, the first clutch mechanism C1, the second clutch mechanism C2, and the brake mechanism B1 are executed by an in-vehicle control apparatus 100 (hereinafter, referred to as control apparatus) mounted on the vehicle 500.

The control apparatus 100 includes a central processing unit (hereinafter, referred to as CPU) 110 and a memory 120 in which programs and data for control are stored. The CPU 110 runs the programs stored in the memory 120 to execute various controls. Although not shown in the drawing, the control apparatus 100 is made up of a plurality of control units such as a control unit for the internal combustion engine 10 and a control unit for the hydraulic circuit 300.

A crank angle sensor 11, an air flow meter 12, an accelerator position sensor 13, and a vehicle speed sensor 14 are connected to the control apparatus 100. The crank angle sensor 11 detects the rotation angle of the crankshaft 18. The air flow meter 12 detects the intake air volume GA of the internal combustion engine 10. The accelerator position sensor 13 detects an accelerator operation amount ACCP that is the operation amount of an accelerator pedal. The vehicle speed sensor 14 detects the vehicle speed SP of the vehicle 500. A speed sensor 15, a speed sensor 16, and a stroke sensor 17 are also connected to the control apparatus 100. The speed sensor 15 detects a sleeve rotation speed NS that is the rotation speed of the sleeve 54. The speed sensor 16 detects a gear rotation speed NG that is the rotation speed of the idler gear 58. The stroke sensor 17 detects a sleeve position ST that is the position of the sleeve 54 in the axial direction M. The sleeve position ST is a value expressed by the amount of movement of the sleeve 54 from an origin position STsp set to, for example, the position of the sleeve 54 when the synchromesh mechanism S1 is placed in the released state, and the sleeve position ST is detected by actually detecting the amount of movement of the fork shaft 91 from the origin position STsp. Output signals from those various sensors are input to the control apparatus 100. The control apparatus 100 calculates an engine rotation speed NE based on an output signal Scr from the crank angle sensor 11.

The control apparatus 100 obtains the operating status of the internal combustion engine 10, the running status of the vehicle 500, and the like based on detected signals of the various sensors and executes output control over the internal combustion engine 10 and switching control over the drive mode via the hydraulic circuit 300 in accordance with the obtained statuses.

As one of such switching control over the drive mode, the control apparatus 100 controls the position of the sleeve 54 to release or engage the synchromesh mechanism S1. In this position control, when the vehicle 500 transitions from a stopped state to a traveling state or when the vehicle speed SP changes from the high vehicle speed range to the intermediate vehicle speed range during belt driving, the control apparatus 100 moves the sleeve 54 in the engaging direction MK to engage the synchromesh mechanism S1 placed in the released state.

On the other hand, when the vehicle speed SP changes from the low vehicle speed range to the intermediate vehicle speed range during gear driving or when the vehicle speed SP changes from the intermediate vehicle speed range to the high vehicle speed range during belt driving, the control apparatus 100 moves the sleeve 54 in the releasing direction MR to release the synchromesh mechanism S1 placed in the engaged state.

When the synchromesh mechanism S1 is changed from the released state to the engaged state in a situation in which the rotation speed of each drive wheel 80 is easy to steeply change, such as a low μ road and a rough road, that is, when the synchromesh mechanism S1 that has been placed in the released state till then is engaged in response to a change in the vehicle speed SP from the high vehicle speed range to the intermediate vehicle speed range during belt driving, gear rattle may occur.

In other words, in the state shown in FIG. 2B, that is, in the process in which synchronization completes and the splines 54s of the sleeve 54 thrust into the splines 55s of the synchronizer ring 55, frictional force between the tapered surface T and the cone surface C disappears. For this reason, from when synchronization completes to when the sleeve chamfer 54c contacts with the gear chamfer 58c provided at the distal end in the splines 58s of the idler gear 58, the idler gear 58 coupled to the output shaft 60 is rotatable relative to the sleeve 54 coupled to the input shaft 23. In this relatively rotatable state, when the rotation speed of at least one of the drive wheels 80 coupled to the output shaft 60 steeply changes, the rotation speed of the idler gear 58 also changes with the change. As a result, there occurs a difference between the rotation speed of the sleeve 54 and the rotation speed of the idler gear 58, and the sleeve 54 and the idler gear 58 become out of synchronization. In this out-of-synchronization state, when the splines 54s of the sleeve 54 attempt to mesh with the splines 58s of the idler gear 58, the sleeve chamfer 54c and the gear chamfer 58c collide with each other, with the result that gear rattle occurs.

Each time such gear rattle occurs, the sleeve chamfer 54c and the gear chamfer 58c get damaged. When the degree of wear and tear of the sleeve chamfer 54c and the gear chamfer 58c exceeds a prescribed value, there may occur such inconvenience that the sleeve chamfer 54c or the gear chamfer 58c breaks and, as a result, a piece of the breakage is, for example, involved in the gear.

Therefore, the control apparatus 100 of the present embodiment calculates a degree of wear and tear DA and, when the calculated degree of wear and tear DA becomes higher than or equal to a prescribed determination value DAref, disables the engagement operation of the synchromesh mechanism S1.

Figure 3:
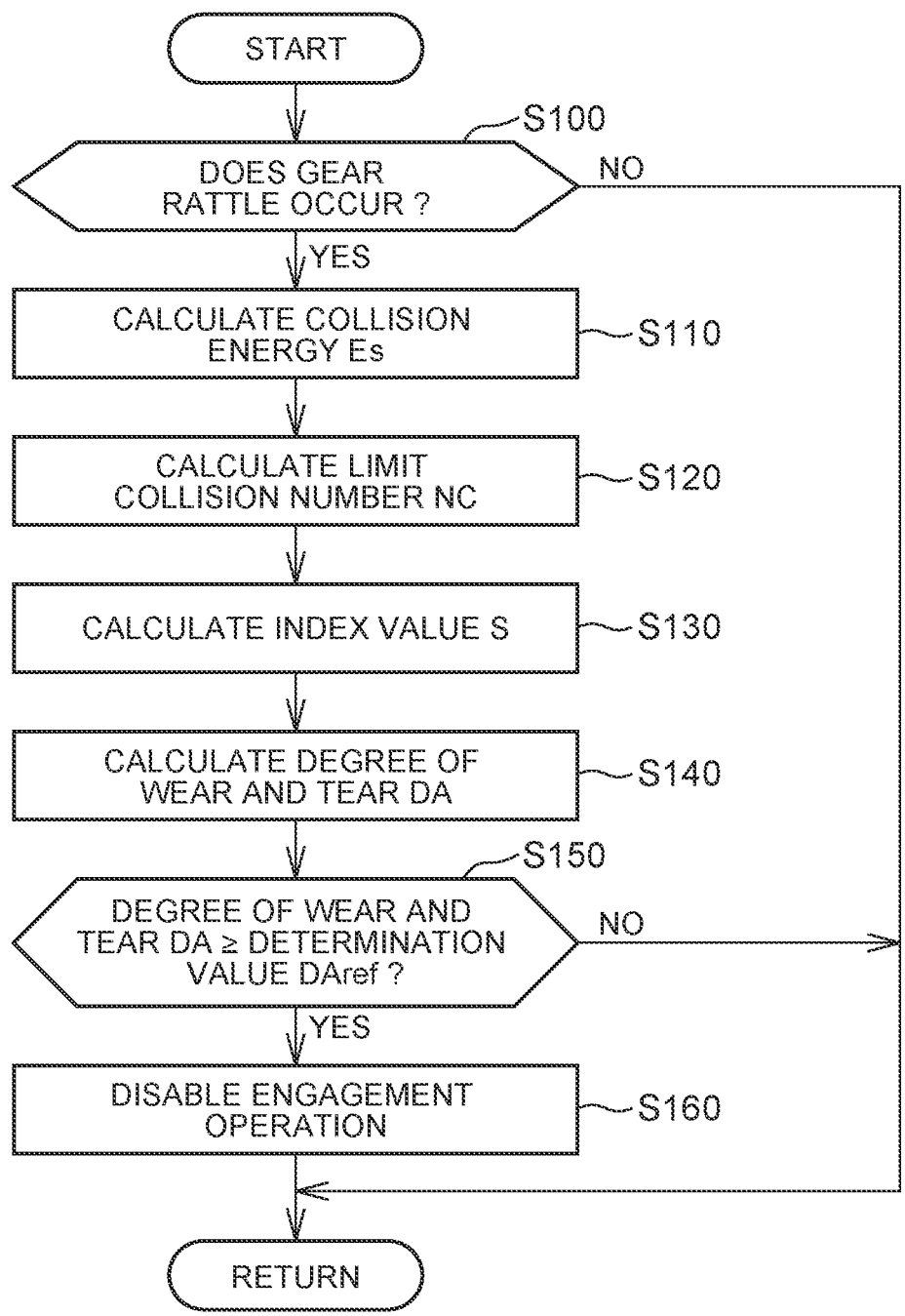
FIG. 3 is a flowchart that shows the procedure of a process that is executed by the in-vehicle control apparatus of the embodiment.

Hereinafter, a procedure related to calculation of a degree of wear and tear and disabling of the engagement operation of the synchromesh mechanism S1 will be described with reference to FIG. 3. The process shown in FIG. 3 is implemented by the CPU 110 running the programs stored in the memory 120 of the control apparatus 100. The control apparatus 100 repeatedly executes the process shown in FIG. 3 at predetermined intervals until engagement of the synchromesh mechanism S1 completes after engagement of the synchromesh mechanism S1 is started. Hereinafter, numerals prefixed with "S" represent step numbers.

When the process is started, the control apparatus 100 executes a gear rattle determination process of determining whether gear rattle occurs (S100). In the present embodiment, gear rattle determination is performed in the following manner.

Figure 4:
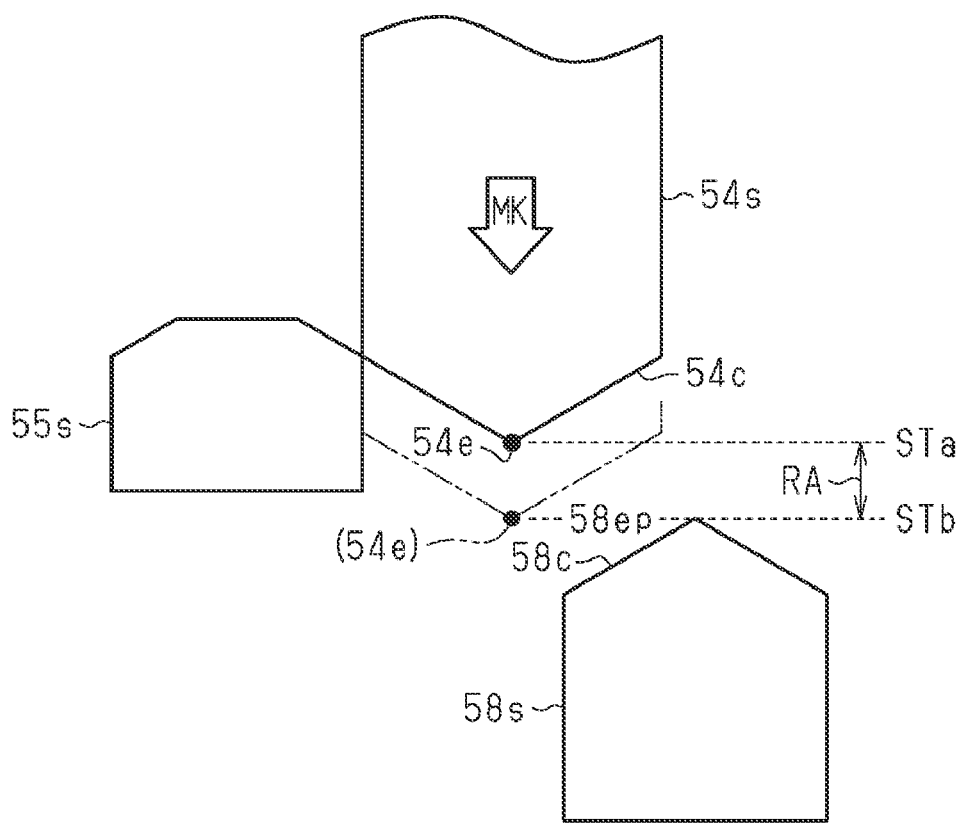
FIG. 4 is a schematic diagram that shows a positional relationship between a sleeve chamfer and a gear chamfer in the middle of engagement.

As shown in FIG. 4, the sleeve position ST at the time when synchronization between the sleeve 54 and the idler gear 58 completes and the splines 54s of the sleeve 54 begin to thrust into the splines 55s of the synchronizer ring 55 is defined as first position STa.

After the thrust, the splines 54s of the sleeve 54 approach the splines 58s of the idler gear 58, and the sleeve position ST at the time when a distal end 54e of the sleeve chamfer 54c is aligned with a distal end position 58ep of the gear chamfer 58c facing the sleeve chamfer 54c is defined as second position STb. The first position STa and the second position STb are fixed values that depend on the design specifications of the synchromesh mechanism S1.

A section between the first position STa and the second position STb is preset as determination section RA. When the sleeve position ST falls within the determination section RA, the idler gear 58 coupled to the output shaft 60 after synchronization is rotatable relative to the sleeve 54 coupled to the input shaft 23 as described above. Therefore, when there is a difference between the rotation speed of the sleeve 54 and the rotation speed of the idler gear 58 while the sleeve position ST falls within the determination section RA, it may be determined that the sleeve 54 and the idler gear 58 are out of synchronization then and gear rattle occurs.

Therefore, when the difference between a sleeve rotation speed NS that is the rotation speed of the sleeve 54 and a gear rotation speed NG that is the rotation speed of the idler gear 58 is greater than or equal to a prescribed value while the sleeve position ST falls within the determination section RA, the control apparatus 100 determines that gear rattle occurs. On the other hand, when the difference between the sleeve rotation speed NS and the gear rotation speed NG is less than the prescribed value while the sleeve position ST falls within the determination section RA, the control apparatus 100 determines that gear rattle does not occur. Other than the above, gear rattle determination may be performed in a known mode.

When the control apparatus 100 determines that gear rattle does not occur (NO in S100), the control apparatus 100 once ends the process. On the other hand, when the control apparatus 100 determines that gear rattle occurs (YES in S100), the control apparatus 100 executes a collision degree calculation process of calculating a collision degree that indicates the magnitude of a collision between the sleeve chamfer 54c and the gear chamfer 58c (S110). In the collision degree calculation process, a collision energy Es at the time when the sleeve chamfer 54c and the gear chamfer 58c collide with each other is calculated as the collision degree.

In the collision degree calculation process, the control apparatus 100 acquires the sleeve rotation speed NS and the gear rotation speed NG. Then, the control apparatus 100 calculates a sleeve movement speed Vs1 based on the sleeve rotation speed NS. The sleeve movement speed Vs1 is a movement speed of the splines 54s per unit time in the rotation direction of the sleeve 54. The control apparatus 100 also calculates a gear movement speed Vp based on the gear rotation speed NG. The gear movement speed Vp is a movement speed of the splines 58s per unit time in the rotation direction of the idler gear 58. Then, the control apparatus 100 calculates a speed difference ΔV that is a difference between the sleeve movement speed Vs1 and the gear movement speed Vp. The control apparatus 100 also calculates a movement speed Vs2 of the sleeve 54 in the axial direction M by calculating a variation per unit time in the sleeve position ST.

The control apparatus 100 calculates a collision speed Vg at the time when the sleeve chamfer 54c and the gear chamfer 58c collide with each other by calculating the square root of the sum of the square of the speed difference ΔV and the square of the movement speed Vs2 as expressed by the following expression (1).

$$Vg = (\Delta V^2 + Vs2^2)^{(1/2)} \quad (1)$$

The control apparatus 100 calculates a collision energy Es by multiplying the square of the collision speed Vg by an adaptation factor K ($Es = Vg^2 \times K$). The adaptation factor K is found from an equivalent inertia from the first clutch mechanism C1 to the synchronizer ring 55 and the inertia of the idler gear 58 in the first transmission path.

Subsequently, the control apparatus 100 executes a process of calculating a limit collision number NC based on the calculated collision energy Es (S120). The limit collision number NC is the following value. In other words, the limit collision number NC is the number of collisions between the sleeve chamfer 54c and the gear chamfer 58c at the time when the degree of wear and tear DA of the sleeve chamfer 54c and the gear chamfer 58c reaches a prescribed value to such an extent that the engagement operation of the synchromesh mechanism S1 is disabled.

Figure 5:
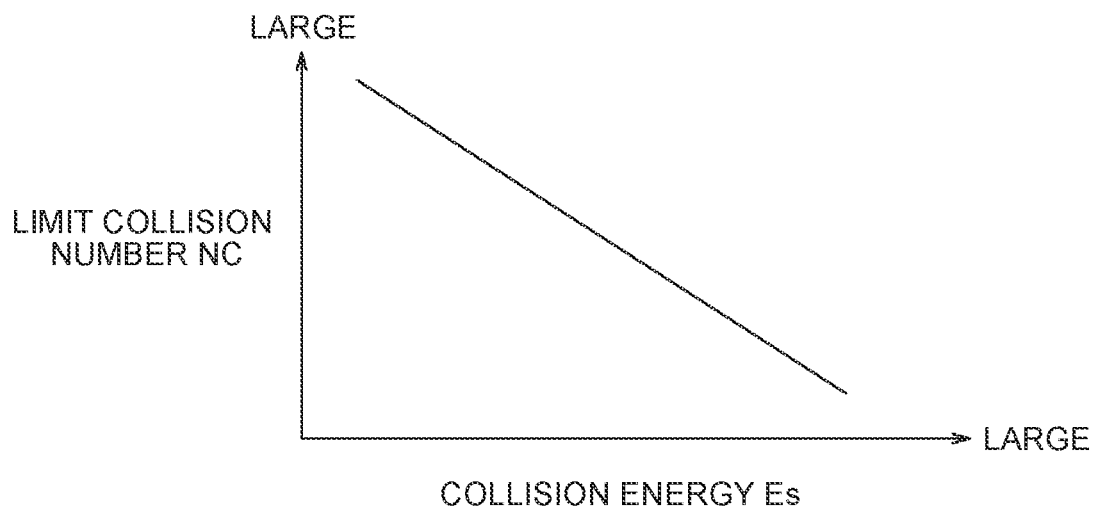
FIG. 5 is a conceptual graph that shows a relationship between a collision energy and a limit collision number that is calculated by the in-vehicle control apparatus of the embodiment.

As shown in FIG. 5, the limit collision number NC reduces as the collision energy Es per one collision increases. A map or relational expression that represents the correlation between a collision energy Es and a limit collision number NC as shown in FIG. 5 is stored in the memory 120. In S120, the control apparatus 100 calculates a limit collision number NC for the collision energy Es calculated in S110.

Subsequently, the control apparatus 100 executes an index value calculation process of calculating an index value S that correlates with wear and tear of the sleeve chamfer 54c and the gear chamfer 58c by using the limit collision number NC calculated based on the collision energy Es (S130).

In the index value calculation process, the control apparatus 100 calculates a fraction of which the denominator is set to the limit collision number NC calculated in S120 and the numerator is set to the current number of collisions, that is, one, as an index value S (S=1/NC).

Subsequently, the control apparatus 100 executes a wear and tear degree calculation process of calculating the degree of wear and tear DA (S140). In the wear and tear degree calculation process, the control apparatus 100 calculates the degree of wear and tear DA in execution of the current process by adding the index value S calculated in S130 to the current degree of wear and tear DA and updates the degree of wear and tear DA. An initial value of the degree of wear and tear DA is zero.

Each time the control apparatus 100 determines in S100 that gear rattle occurs, the control apparatus 100 adds the index value S, which varies with a collision energy Es, to the degree of wear and tear DA, with the result that the degree of wear and tear DA gradually increases from zero that is the initial value. When the collision energy Es is large and the limit collision number NC is small, the index value S is large, so an increase in the updated degree of wear and tear DA from the pre-updated degree of wear and tear DA increases as compared to when the collision energy Es is small.

When the degree of wear and tear DA becomes one, it is determined that the sleeve chamfer 54c and the gear chamfer 58c are damaged to such an extent that the engagement operation of the synchromesh mechanism S1 is disabled.

Subsequently, the control apparatus 100 determines whether the degree of wear and tear DA updated in S140 is higher than or equal to a determination value DAref (S150). The determination value DAref is set to one in the present embodiment. When the control apparatus 100 determines that the degree of wear and tear DA is lower than the determination value DAref (NO in S150), the control apparatus 100 once ends the process.

On the other hand, when the control apparatus 100 determines that the degree of wear and tear DA is higher than or equal to the determination value DAref (YES in S150), the control apparatus 100 disables the engagement operation of the synchromesh mechanism S1 thereafter (S160) and ends the process.

The operation and advantageous effects of the present embodiment will be described.

(1) In the series of procedure shown in FIG. 3, when it is determined that gear rattle occurs, a collision energy Es that indicates a collision degree between the sleeve chamfer 54c and the gear chamfer 58c is calculated based on the rotation speed difference between the sleeve 54 and the idler gear 58 in S110. In S120 and S130, the index value S that correlates with the wear and tear of the sleeve chamfer 54c and the gear chamfer 58c is calculated based on the calculated collision energy Es. In S140, by integrating the index value S that is calculated each time it is determined that gear rattle occurs, the degree of wear and tear DA of the sleeve chamfer 54c and the gear chamfer 58c is calculated. The degree of wear and tear DA is a value that is calculated based on a rotation speed difference between the sleeve 54 and the idler gear 58 when it is determined that gear rattle occurs, as a start point, and such a rotation speed difference is reliably grasped even in a state where the wear and tear of the sleeve chamfer 54c and the gear chamfer 58c is small. Therefore, it is possible to calculate the degree of wear and tear DA even in a state where the wear and tear of the sleeve chamfer 54c and the gear chamfer 58c of the synchromesh mechanism S1 is small.

(2) In calculating the collision energy Es in S110, not only the rotation speed difference but also the movement speed Vs2 of the sleeve 54 is considered, so the accuracy of calculating the collision energy Es improves.

(3) The limit collision number NC reduces as the collision energy Es increases, so the index value S that is indicated by a fraction of which the denominator is set to the limit collision number NC and the numerator is set to one increases as the collision energy Es increases. For this reason, the degree of wear and tear DA, obtained by integrating the index value S, when the collision energy Es is large increases earlier than the degree of wear and tear DA when the collision energy Es is small. Therefore, it is possible to appropriately calculate an index value that correlates with the wear and tear of the sleeve chamfer 54c and the gear chamfer 58c based on the collision energy Es.

(4) When the degree of wear and tear DA is higher than or equal to the determination value DAref, the engagement operation of the synchromesh mechanism S1 is disabled in S160, so it is possible to suppress an increase in the degree of wear and tear DA of the sleeve chamfer 54c and the gear chamfer 58c over the determination value DAref.

The present embodiment may be modified as follows. The present embodiment and the following modifications may be implemented in combination with each other without any technical contradiction.

The determination value DAref is set to one; however, the determination value DAref may be set to another value. When, for example, the engagement operation is intended to be disabled earlier than when the determination value DAref is set to one, the determination value DAref may be set to a value less than one.

In S150 shown in FIG. 3, when it is determined that the degree of wear and tear DA is higher than or equal to the determination value DAref, the engagement operation of the synchromesh mechanism S1 is disabled. Alternatively, another process may be executed.

For example, a communication device that communicates with an external device is installed in the vehicle 500 in advance. When the control apparatus 100 determines that the degree of wear and tear DA is higher than or equal to the determination value DAref, the control apparatus 100 transmits a replacement signal to make a request for replacement of the sleeve 54 and the idler gear 58 to an external server together with an identification number of the vehicle 500 via the communication device. The external server having received the signal identifies a car maintenance shop that maintains the vehicle 500 from the identification number of the vehicle 500 and issues a request to replace parts to the car maintenance shop. The car maintenance shop having received the replacement request asks a user of the vehicle 500 to drive the vehicle 500 to the shop for parts replacement. With such a modification, it is possible to reduce, for example, a situation in which parts having the sleeve chamfer 54c or the gear chamfer 58c remain damaged.

The actuator 92, the first clutch mechanism C1, the second clutch mechanism C2, and the brake mechanism B1 are of hydraulic type. Alternatively, the actuator 92, the first clutch mechanism C1, the second clutch mechanism C2, and the brake mechanism B1 may be of electric type.

A value other than the collision energy Es may be calculated as a value that indicates the collision degree. A value other than a fraction of which the denominator is set to the limit collision number NC and the numerator is set to one may be calculated as a value that indicates the index value.

The series of procedure shown in FIG. 3 may be applied to a synchromesh mechanism provided in a manual transmission.

The control apparatus 100 is not limited to the one that includes the CPU 110 and the memory 120 and that executes software processing. The control apparatus 100 may include, for example, a dedicated hardware circuit (for example, ASIC or the like) that processes at least part of software processing that is executed in the embodiment. In other words, the control apparatus 100 may be configured as any one of the following (a), (b), and (c). (a) The control apparatus 100 includes a processing unit that executes all the processes in accordance with programs and program storage, such as memory, that stores the programs. (b) The control apparatus 100 includes a processing unit and program storage that execute part of the processes in accordance with programs and a dedicated hardware circuit that executes the remaining processes. (c) The control apparatus 100 includes a dedicated hardware circuit that executes all the processes. A plurality of the software processing circuits each including a processor and program storage, or a plurality of the dedicated hardware circuits may be provided. In other words, the processes just need to be executed by a processing circuit including at least one of one or plurality of software processing circuits and one or plurality of dedicated hardware circuits.

What is claimed is:

1. An in-vehicle control apparatus applied to a vehicle provided with a synchromesh mechanism, the synchromesh mechanism including
an idler gear provided on a shaft so as to be rotatable relative to the shaft, the idler gear having splines, a synchronizer hub configured to rotate integrally with the shaft, the synchronizer hub having splines,
a sleeve disposed radially outward of the synchronizer hub, the sleeve having splines configured to mesh with the splines of the synchronizer hub and the splines of the idler gear, the sleeve being movable in an axial direction of the shaft,
a synchronizer ring provided between the synchronizer hub and the idler gear, and
a movement mechanism configured to move the sleeve in the axial direction, the synchromesh mechanism being placed in an engaged state where transmission of driving force between the shaft and the idler gear is enabled, by causing the sleeve to move to mesh the splines of the sleeve with the splines of the idler gear, the in-vehicle control apparatus comprising a processor configured to:
execute a gear rattle determination process of, when the synchromesh mechanism is placed in the engaged state, determining whether gear rattle due to a collision between a sleeve chamfer provided at a distal end of the splines of the sleeve and a gear chamfer provided at a distal end of the splines of the idler gear occurs;

execute a collision degree calculation process of, when it is determined in the gear rattle determination process that gear rattle occurs, calculating a collision degree indicating a magnitude of collision between the sleeve chamfer and the gear chamfer based on a rotation speed difference between the sleeve and the idler gear;

execute an index value calculation process of calculating an index value that correlates with wear and tear of the sleeve chamfer and the gear chamfer based on the collision degree that is calculated each time it is determined that the gear rattle occurs; and execute a wear and tear degree calculation process of calculating a degree of wear and tear of the sleeve chamfer and the gear chamfer by integrating the index value that is calculated each time it is determined that the gear rattle occurs.

2. The in-vehicle control apparatus according to claim 1, wherein the processor is configured to execute a process of calculating the collision degree based on the rotation speed difference and a movement speed of the sleeve in the collision degree calculation process.

3. The in-vehicle control apparatus according to claim 1, wherein:

the collision degree that is calculated in the collision degree calculation process is a collision energy at a collision of the sleeve chamfer and the gear chamfer; and where the number of collisions between the sleeve chamfer and the gear chamfer when the degree of wear and tear reaches a prescribed value is a limit collision number, the processor is configured to execute a process of calculating the limit collision number such that the limit collision number reduces as the collision energy increases and calculating a fraction of which a denominator is set to the calculated limit collision number and a numerator is set to one, as the index value in the index value calculation process.

4. The in-vehicle control apparatus according to claim 1, wherein:

the movement mechanism includes an actuator configured to move the sleeve and configured to execute an engagement operation of the synchromesh mechanism through drive control over the actuator; and the processor is configured to, when the degree of wear and tear is higher than or equal to a prescribed determination value, execute a process of disabling the engagement operation of the synchromesh mechanism.

* * * * *